Dec. 18, 1951  M. P. WILDER  2,579,222
METHOD OF SEALING GLASS TO METAL
Filed Aug. 30, 1950  2 SHEETS—SHEET 1

INVENTOR.
MARSHALL P. WILDER
BY
Ralph E. Bitner
ATTORNEY

Dec. 18, 1951  M. P. WILDER  2,579,222
METHOD OF SEALING GLASS TO METAL
Filed Aug. 30, 1950  2 SHEETS—SHEET 2

INVENTOR.
MARSHALL P. WILDER
BY Ralph E. Bitner
ATTORNEY

Patented Dec. 18, 1951

2,579,222

UNITED STATES PATENT OFFICE 2,579,222

METHOD OF SEALING GLASS TO METAL

Marshall P. Wilder, Stamford, Conn., assignor to Remington Rand Inc., New York, N. Y., a corporation of Delaware Application August 30, 1950, Serial No. 182,284

3 Claims. (Cl. 49—81)

This invention relates to a method of sealing irregular plates of glass to corresponding metal objects, and has particular reference to a method and means for sealing the rectangular face plates of television tubes to the end portion of the iron cone elements forming a part of the television tube assembly. As used throughout the specification and claims, the term "glass" refers to a material which is non-conducting at ordinary room temperatures but which can be made conducting at high temperatures. All forms of transparent glass, quartz, and many ceramic materials come under this classification.

The first types of oscillograph tubes, known as Braun tubes, were universally made with circular cross sections, and the first television tubes were also constructed along the same lines. These tubes were comparatively easy to make, and if any sealing had to be done, the tube could be rotating about a longitudinal axis while one or more gas flames were used to obtain the proper temperature for sealing. When the glass-metal combination television tubes were first used, they also employed circular cross sections, and the rotating method of heating could be used for these assemblies during the sealing, heating, and aging processes. When the rectangular form of television tube was developed, it became increasingly difficult to seal the glass end plate onto a metal cone since the variation in diameter of the rectangular shape made heating uneven and the operation could not be easily performed on a machine or a glass lathe.

The present invention is directed towards a means for avoiding this difficulty, and by the combination of two forms of gas flame plus the application of high frequency alternating power, even and controlled heating may be effected without rotating the parts to be sealed or the gas burners.

One of the objects of this invention is to provide an improved glass-to-metal sealing method which avoids one or more of the disadvantages and limitations of prior art arrangements.

Another object of the invention is to provide a glass-to-metal sealing method which will be equally effective around rectangular or irregular shaped sealing faces.

Another object of the invention is to shorten the time of heating for glass-to-metal sealing methods.

Another object of the invention is to improve the seal made between a glass-to-metal surface by employing more effective heating methods.

The method herein described includes an application of a pre-heating gas flame which first raises the temperature of the glass face which is to be sealed to a metal rim. The metal rim is heated by a high frequency induction coil or other suitable means. After the pre-heating stage, jets of gas flame are applied to the edge portions of the glass disk and high frequency power is applied to the nozzles which produce the jets. Due to the ionized gas flowing from the nozzles to the high temperature glass rim, high frequency conduction of electricity is possible between selected nozzles and the glass, the major portion of the heat being accomplished by the high frequency currents rather than the gas flame. In order to evenly distribute the heating effect around the rim of an irregular glass face, a commutating distributor head is provided which progressively switches the high frequency currents from one nozzle to another in a continuous rotary manner. As soon as the edge portions of the glass face have been brought to the proper temperature, the glass is brought into a contact with the metal rim and the seal is annealed in the usual manner.

For a better understanding of the present invention, together with other and further objects thereof, reference is made to the following description taken in connection with the accompanying drawings.

Figure 1:
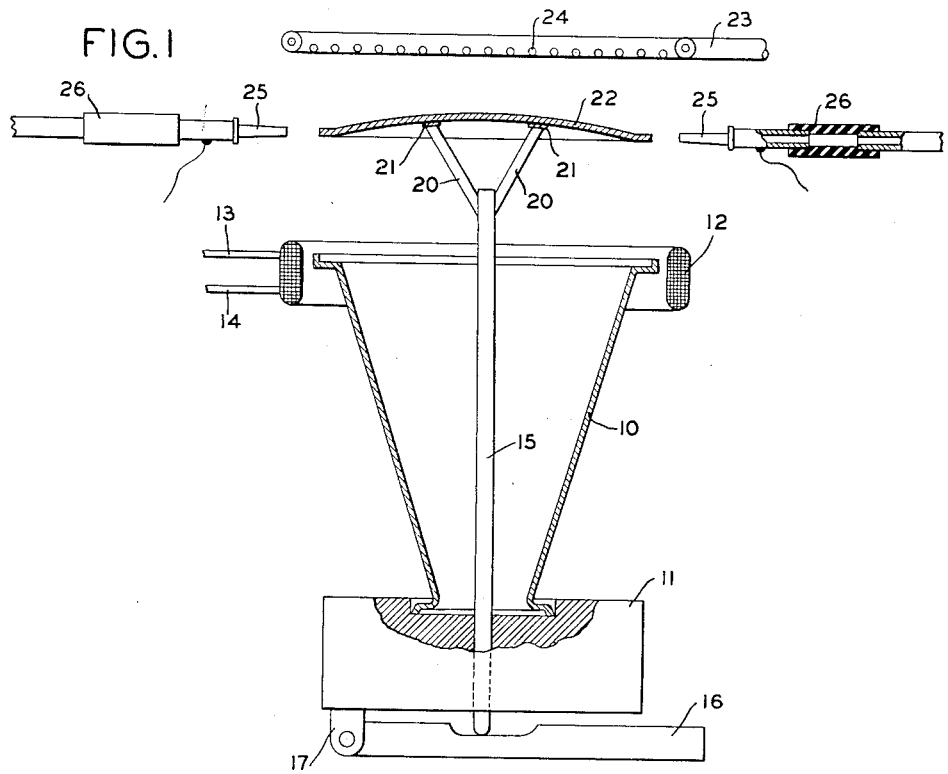
Fig. 1 is a cross sectional view showing the glass face in position for pre-heating, together with the metal cone and the gas nozzles employed in the heating operation.
Figure 2:
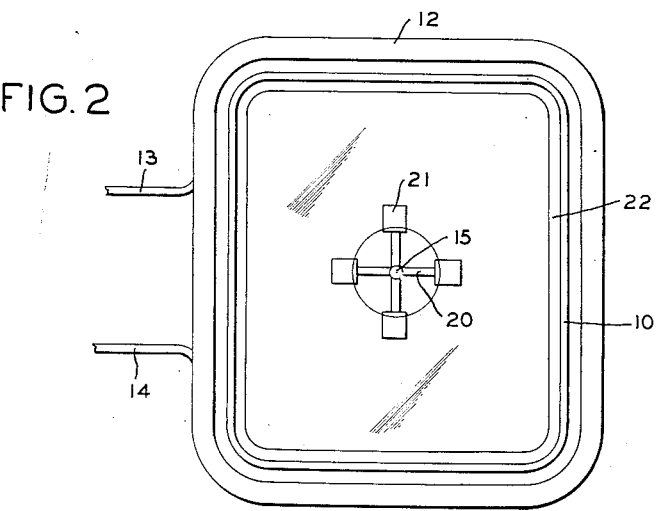
Fig. 2 is a plan view of the end portion of the television tube showing its rectangular shape.

Referring now to Figs. 1 and 2, a metal cone 10 is mounted in a heat-resistant block 11. Neither the cone nor the block undergo any movement during the sealing operation, rotary or otherwise. Around the upper periphery of the metal cone an induction coil 12 is mounted to assist in the pre-heating of the metal rim. The induction coil is provided with terminal conductors 13 and 14 which are connected to a suitable source of alternating current power to heat the rim in a manner which is well known to the art.

In the center of the stationary block 11 a supporting rod 15 is positioned which is held at its lower end by a lever 16 suitably pivoted by a bracket 17. The rod 15 is adjusted to slide vertically within the block under control of the lever or other suitable raising and lowering mechanism. At the top of rod 15 three or more small levers 20 are mounted, being pivoted to the rod at their lower end and containing asbestos pads 21 at their upper ends. A glass plate 22, which is to be sealed to the metal cone, 10, is accurately centered on the levers 20 in the position shown in the figure so that when rod 15 is lowered the glass face 22 will fit within the upper rim of the metal cone. Directly above the glass face 22 is a gas burner 23 which contains a large number of holes 24 suitably arranged to produce a blanket pre-heating flame which is directed downwardly towards the glass face and pre-heats it in an even manner prior to the application of the edge heating jets. The burner 23 may also be employed in the annealing process which finishes the sealing method.

Equally spaced around the glass face 22 are a plurality of gas nozzles 25. The nozzles are made of metal so that they may be used to conduct high frequency current, but they are insulated from the main gas supply by insulating sections 26 to keep the applied high frequency power away from the general gas supply line.

Figure 3:
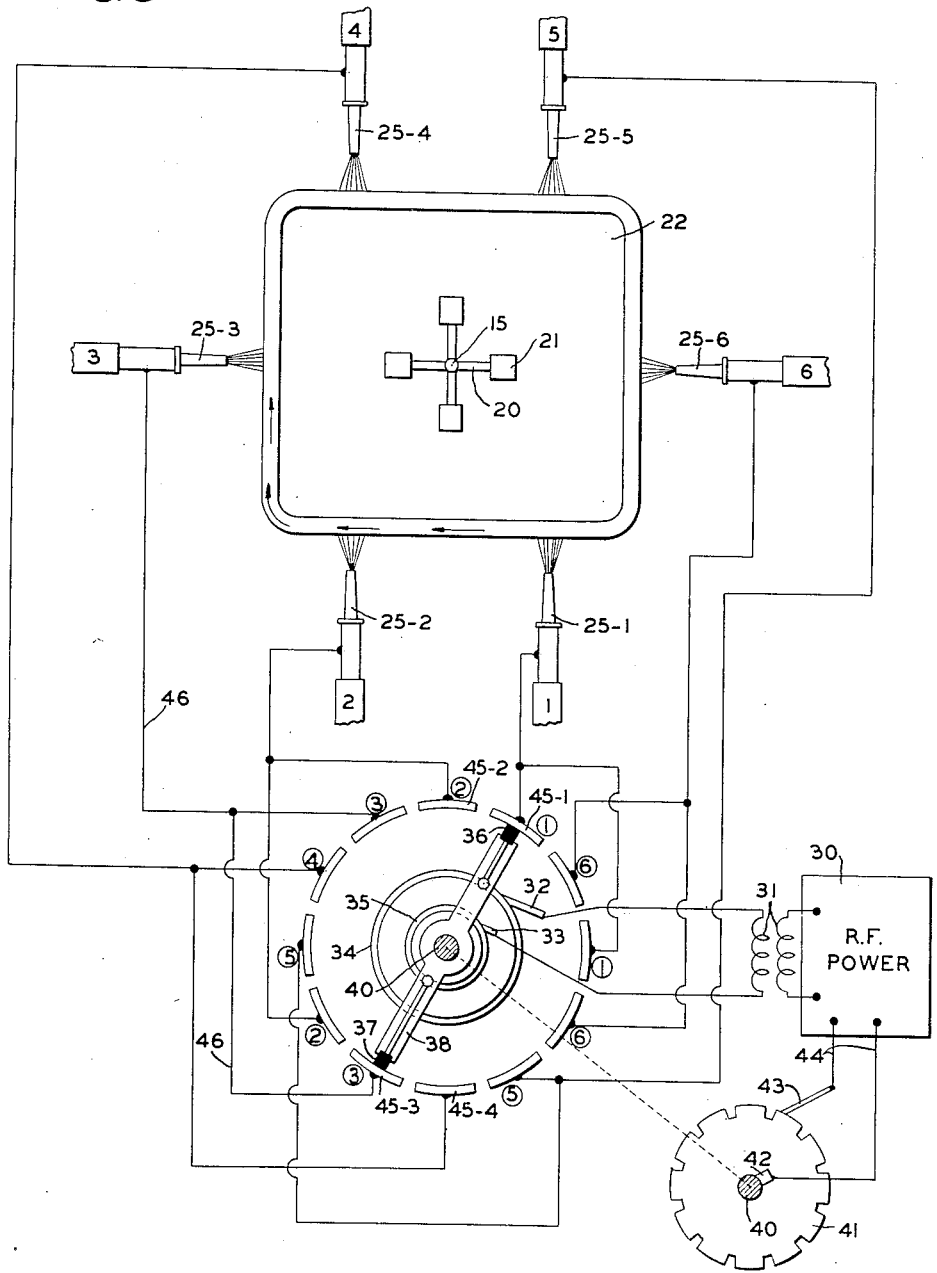
Fig. 3 is a schematic diagram of connections showing six gas nozzles spaced around a rectangular glass face plate, together with a commutation means for distributing high frequency power in a progressive manner between the insulated nozzle portions.

Fig. 3 shows the diagram of connections by which the high frequency power may be applied to the gas jets. In this example, six nozzles are used, spaced more or less evenly around the irregular shape of the glass face 22. The high frequency power may be obtained from any of the usual generators used for this purpose. An electronic tube generator or a high frequency armature field dynamo may be employed. Also, a spark gap with the usual high frequency circuit can be used for this application.

The power source 30 shown in block is coupled by a transformer 31 to conductors which connect with brushes 32 and 33. The brushes are resiliently held against slip rings 34 and 35 and the slip rings in turn are connected to rotary brushes 36 and 37. The slip rings and brushes are mounted on an insulated bar 38 which is secured to a shaft 40, this shaft being rotated during the operation by any suitable means such as hand power or electric motor. Also secured to shaft 40 is an interrupter, shown in Fig. 3 as a toothed wheel 41 with two brushes 42 and 43. Other types of interrupter, such as cam operated contacts, may be used in this connection. The interrupter is connected by conductors 44 to the radio frequency power supply 30 and interrupts the power during the time that brushes 36 and 37 move from one commutator segment to another. This interruption of power is necessary because the radio frequency power supplied to the commutator is of such a frequency and voltage that if it were not cut off at the source an arc would be formed which would bridge the commutator segments and send current to unwanted circuits. The interrupter is applied to a portion of the radio frequency power supply which has a low voltage and which may be interrupted without serious results.

At equally spaced positions around the rotating arm 38 is a series of twelve conducting segments 45, each segment being connected to one of the nozzles 25. Due to the novel method herein described of progressively advancing the radio frequency circuit, each nozzle is connected to two segments. In the position shown in Fig. 3, radio frequency power after being transformed by the transformer 31 traverses a circuit which may be traced to brush 32, slip ring 34, brush 36, commutator segments 45—1, nozzle 25—1, thence through the ionized portion of the gas jet to the hot edge of the glass face 22 and around the rim in a direction indicated by the arrows to the ionized flame coming from nozzle 25—3, thence over conductor 46 to the segment 45—3, thence to brush 37, slip ring 35, brush 33 and back to the secondary of transformer 31. In this position, therefore, the heating current around the glass rim runs from nozzles which are positioned two spaces apart. The arm 38 moves in a counterclockwise direction and the next position makes contact with upper brush 36 and segment 45—2, also with the lower brush 37 and commutator segment 45—4. By tracing out these connections to the nozzles, it will be obvious that the next circuit moves from nozzle 25—2 around the rim to nozzle 25—4. The next commutator position results in the application of the high frequency current to nozzles 25—3 and 25—5, each path using the space between alternate nozzles, but the commutated motion providing for successive nozzles to be energized. A complete revolution of arm 38 will cause a complete revolution of the applied high frequency power around the perimeter of the glass face 22, and when the arm is moved at a speed of approximately two hundred revolutions per minute an even application of heat is provided around the entire glass periphery regardless of its shape. The gas flames used by the nozzles need not be intense and do not have to provide more heat than the usual Bunsen burner since the major part of the heating is done by the radio frequency power.

The complete operation of the system may be better understood by referring to Fig. 1. The sequence of events is as follows:

First, the pre-heating gas flame through openings 24 in burner 23 is directed against the glass face 22 and at the same time the upper arm of the metal cone 10 is heated by the induction coil 12. After a suitable pre-heating interval, which heats the glass to a semi-conductive condition, flames from nozzles 25 are lighted and radio frequency power is turned on in the progressive circulating manner described above. The radio frequency power is increased in intensity until the edge of the glass face 22 assumes the proper temperature for sealing and then lever 16 is lowered, permitting the glass face to be lowered into contact with the upper rim of the metal cone 10. During the last phase of the operation additional power may be applied to the induction coil 12 to heat it to sealing temperature. After the seal has been made, temperature of both glass and metal may be reduced slowly by the application of a smaller amount of heat from burner 23 and from the induction heating coil 12.

The foregoing method has been specifically applied to a television tube having a rectangular glass face and a metal cone, but it will be obvious that the same method may be applied to other glass-to-metal seals having irregular shapes or rectangular contours which make it difficult to heat while the object is being rotated.

While there have been described and illustrated specific embodiments of the invention, it will be obvious that various changes and modifications may be made therein without departing from the field of the invention which should be limited only by the scope of the appended claims.

What is claimed is:

1. The method of sealing non-circular glass objects to metal objects of similar shape while held in a stationary position which includes the following steps; pre-heating the glass to a semi-conducting temperature; pre-heating the metal to a sealing temperature; applying high frequency alternating current electrical power to the glass portions to be heated by means of a plurality of burning gas jets, said jets flowing from conductive nozzles which are insulated from each other; and progressively moving the application positions of said electrical power from one nozzle to another in a rotary cyclic manner by means of a rotary commutator in a high frequency supply line and at the same time interrupting the power supply by means of a second rotary commutator in a low voltage supply line.

2. The method of sealing non-circular glass objects to metal objects of similar shape while held in a stationary position which includes the following steps; pre-heating the glass to a semi-conducting temperature by a gas flame; preheating the metal to a sealing temperature by induced electric currents; applying high frequency alternating current electrical power to the glass portions to be heated by means of a plurality of burning gas jets, said jets flowing from conductive nozzles which are insulated from each other; and progressively moving the applications of said electrical power from one pair of nozzles to another pair in a rotary cyclic manner, said progressive motion supplied by a first rotating commutator in the high frequency supply lines which are connected to the nozzles, said high frequency power being controlled by a second rotating commutator in a low voltage supply line.

3. The method of sealing non-circular glass objects to metal objects of similar shape while held in a stationary position which includes the following steps; pre-heating the glass to a semi-conducting temperature by a gas flame; pre-heating the metal to a sealing temperature by induced electric currents; applying high frequency alternating current electrical power to the glass portions to be heated by means of a plurality of burning gas jets, said jets flowing from conductive nozzles which are insulated from each other; and progressively moving the applications of said electrical power from one pair of nozzles to another pair in a rotary cyclic manner, said progressive motion supplied by a first rotating commutator which switches the high frequency power from one set of nozzles to another set, and a second rotary commutator which opens the low voltage power supply during time intervals which include the switching time of the first rotating commutator.

MARSHALL P. WILDER.

REFERENCES CITED

The following references are of record in the file of this patent:

UNITED STATES PATENTS

| Number | Name | Date |
| --- | --- | --- |
| 2,296,307 | Power | Sept. 22, 1942 |
| 2,306,054 | Guyer (I) | Dec. 22, 1942 |
| 2,383,113 | Dailey | Aug. 21, 1945 |
| 2,428,969 | Guyer (II) | Oct. 14, 1947 |
| 2,445,063 | Guyer (III) | July 13, 1948 |
| 2,462,205 | Machlett et al. | Feb. 22, 1949 |